United States Patent [19]
Abildskov, deceased

[11] Patent Number: 4,782,864
[45] Date of Patent: Nov. 8, 1988

[54] THREE DIMENSIONAL WOVEN FABRIC CONNECTOR

[75] Inventor: Dale Abildskov, deceased, late of Salt Lake City, Utah, by Tracy Collins, Bank & Trust, Personal Representative

[73] Assignee: Edo Corporation, College Point, N.Y.

[21] Appl. No.: 687,956

[22] Filed: Dec. 31, 1984

[51] Int. Cl.[4] .......................... D03D 3/00; B64C 3/18
[52] U.S. Cl. ................ 139/384 R; 244/131; 428/225
[58] Field of Search ........... 139/383 R, 383 B, 384 R, 139/389, 390, 410; 244/131, 132; 160/178 E, 178 F; 428/221, 222, 224, 225, 227, 257, 119

[56] References Cited

U.S. PATENT DOCUMENTS

| | | | |
|---|---|---|---|
| 1,815,059 | 7/1931 | Goldstein | 139/410 |
| 2,035,950 | 3/1936 | Dillingham et al. | 139/410 |
| 2,200,882 | 5/1940 | Goldsmith | 139/410 |
| 2,279,206 | 4/1941 | Randall | 139/384 R |
| 2,483,916 | 10/1949 | Lysak | 244/132 |
| 3,035,752 | 5/1962 | Tedeschi | 206/45.14 |
| 3,078,881 | 2/1963 | Arnold | 139/384 B |
| 3,090,406 | 5/1963 | Koppelman et al. | 428/119 |
| 3,234,972 | 2/1966 | Koppelman | 139/384 R |
| 3,374,793 | 3/1968 | Young | 139/384 R |
| 3,442,415 | 5/1969 | Glass | 220/334 |
| 3,538,957 | 11/1970 | Rheaume | 139/384 R |
| 3,943,980 | 3/1976 | Rheaume | 139/384 R |
| 3,965,942 | 6/1976 | Hatch | 428/257 |
| 3,983,281 | 9/1976 | Wakeman | 139/384 R |
| 3,991,249 | 11/1976 | Yamashita et al. | 428/257 |
| 4,336,296 | 6/1982 | Fukata et al. | 428/257 |
| 4,344,995 | 8/1982 | Hammer | 244/131 |
| 4,395,450 | 7/1983 | Whitener | 244/131 |

FOREIGN PATENT DOCUMENTS 1099154  8/1955  France ............... 139/384 R

OTHER PUBLICATIONS

Modern Textiles; Title: Modem Developments in Three-Dimensional Fabrics; Author: Paul D. Emerson; Date: Nov. 1969; pp. 50-54.

Primary Examiner—Harvey C. Hornsby
Assistant Examiner—Joseph S. Machuga
Attorney, Agent, or Firm—Thorpe, North & Western

[57] ABSTRACT

A three dimensional woven fabric connector includes a first generally planar section of flexible fabric composed of fibers which run lengthwise and are interwoven with fibers that run crosswise generally at right angles to the lengthwise fibers, and a second generally planar section of flexible fabric composed of lengthwise and crosswise fibers interwoven generally at right angles to one another. The second section of fabric is interwoven with the first section along an intersection of the two sections, with at least one lengthwise fiber being common to the two sections. At least some of the crosswise fibers of each section extend from that section through the intersection to the other section.

2 Claims, 1 Drawing Sheet

U.S. Patent   Nov. 8, 1988   4,782,864
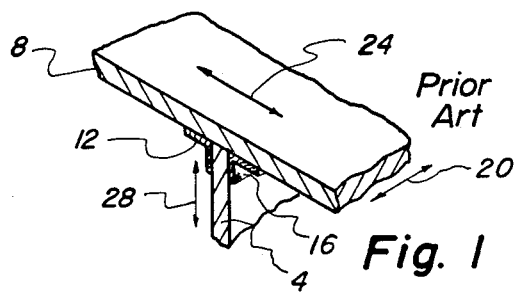
Fig. 1 *Prior Art*
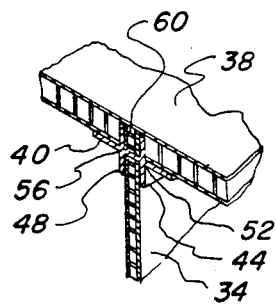
Fig. 2
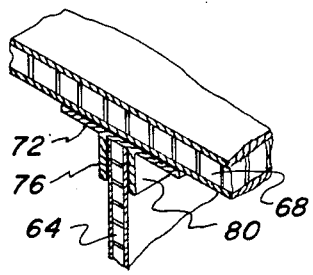
Fig. 3
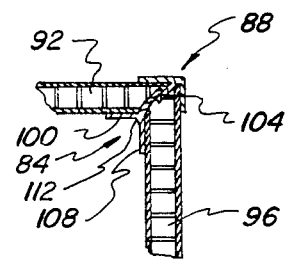
Fig. 4
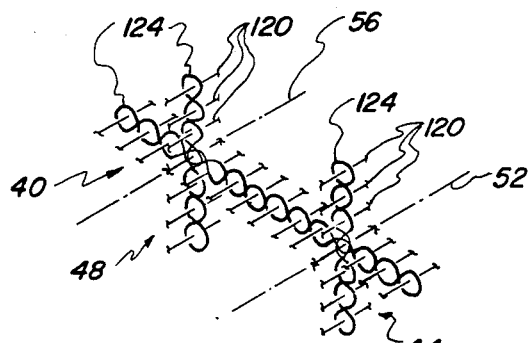
Fig. 5
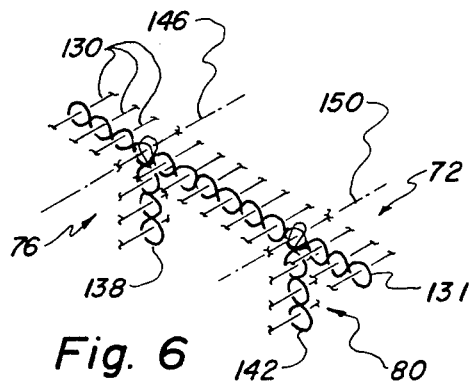
Fig. 6
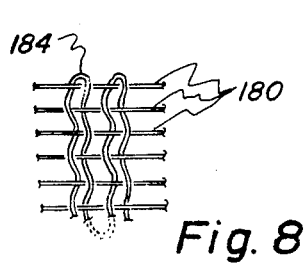
Fig. 8
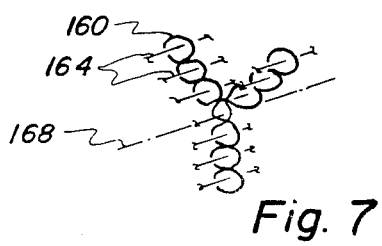
Fig. 7

THREE DIMENSIONAL WOVEN FABRIC CONNECTOR

BACKGROUND OF THE INVENTION

This invention relates to a joint or connector for use in joining together structural components, wherein the joint or connector is made of a three-dimensional woven fabric.

There are a variety of fasteners or connectors by which structural elements may be connected together including bolts, clamps, nails, pins, rivets, screws, and the like. Such connectors are generally made of metal and are thus quite heavy; further, they typically provide for a plurality of contact points between the joined structural elements and thus the loads and stresses between the elements are concentrated at those points. A type of fabric connector has also been used, especially in the aircraft industry, to join structural supports such as spars or ribs to structural coverings such as wing skins. Such fabric connectors which are bonded by adhesive or other fastening mechanism to both the structural support and the structural covering at the joint thereof, although being lightweight, typically provide strength and efficient load transfer in only a limited number of directions, while presenting weaknesses in other directions in the form of pell problems.

SUMMARY OF THE INVENTION

It is an object of the invention to provide a lightweight connector for joining together structural components.

It is also an object of the invention to provide such a connector which provides strength and efficient load transfer in a multiplicity of directions.

It is an additional object of the invention to provide a connector which uniformly distributes loads and stresses between the joined structural components.

It is a further object of the invention to provide a flexible, conformable three-dimensional woven fabric connector suitable for connecting together a variety of structural components.

The above and other objects of the invention are realized in a specific illustrative embodiment of a three-dimensional woven fabric connector which includes a first generally planar section of fabric composed of lengthwise and crosswise fibers interwoven generally at right angles to one another. Also included is a second generally planar section of fabric, also composed of lengthwise and crosswise fibers interwoven generally at right angles to one another, wherein the second section of fabric is interwoven with the first section along an intersection of the two sections, with at least one lengthwise fiber being common to and interwoven with the two sections. With this configuration, strength, and efficient and uniform load transfer is provided in the lengthwise crosswise directions of the fibers.

In accordance with one aspect of the invention, the woven fabric is made of graphite, Kevlar, fiberglass, or similar filament. In accordance with another aspect of the invention, at least some of the crosswise fibers of each section extend from that section through the intersection to the other section to provide strength and efficient load transfer between sections. In accordance with still another aspect of the invention, at least some of the crosswise fibers are interwoven with the lengthwise fibers to extend in one direction to the edge of a section and then about the edge and back in the opposite direction, substantially without break in the fibers.

BRIEF DESCRIPTION OF THE DRAWINGS

The above and other objects, features and advantages of the invention will become apparent from a consideration of the following detailed description presented in connection with the accompanying drawings in which:

FIG. 1 shows a fragmented, cross-sectional view of a prior art arrangement for connecting a structural support to a structural covering;

FIG. 2 is a fragmented, cross-sectional view of a three-dimensional woven connector, in the form of an H, made in accordance with the principles of the present invention;

FIG. 3 is a cross-sectional view of another embodiment of a three-dimensional woven connector, in the form of a T with two legs;

FIG. 4 is a cross-section of another embodiment of a three-dimensional woven connector in the form of a Y;

FIG. 5 is a perspective view of a schematic showing of the crosswise fibers interwoven with the lengthwise fibers of the connector embodiment of FIG. 2;

FIG. 6 is a perspective view of a schematic showing of the crosswise fibers interwoven with the lengthwise fibers of the connector embodiment of FIG. 3;

FIG. 7 is a perspective view of a schematic showing of the crosswise fibers interwoven with the lengthwise fibers of the connector embodiment of FIG. 4; and FIG. 8 is a fragmented view showing the manner in which crosswise fibers may be interwoven with lengthwise fibers in the woven connector of the present invention.

DETAILED DESCRIPTION

FIG. 1 shows a prior art arrangement for connecting a spar or rib 4 (such as might be used in construction of an airplane wing) to another structural component 8 (such as the skin or covering of an aircraft wing). Placed at the joint of the spar 4 and structural component 8 to hold the two together are a pair of fabric connectors 12 and 16 (shown in cross section in FIG. 1). A portion of each fabric connector 12 and 16 is placed flat against and bonded to the structural component 8 while another portion is placed flat against and bonded to the spar 4 as shown. This connector arrangement provides fairly good strength and load transfer efficiency between the spar 4 and structural component 8 when the two components are moved as indicated by arrows 20 relative to one another. However, the strength of the connector is very weak when the two components are moved in the direction indicated by arrows 24 and 28 relative to one another. In particular, such movement would give rise to well known fabric connector peel problems.

The three-dimensional woven fabric connector of the present invention avoids the problems outlined in connection with the FIG. 1 arrangement, and one embodiment of the connector is shown in fragmented, cross-sectional view in FIG. 2. This embodiment is shown connecting a spar 34 to a skin covering 38, such as used in the construction of aircraft. It is noted that both the spar 34 and skin covering 38 are shown as being made of a sandwich wall construction. It should be understood that the woven fabric connectors of the present invention may be used to connect together a variety of structural components in addition to those shown in the drawings.

The connector embodiment of FIG. 2 includes a first section of fabric 40 composed of fibers interwoven together in a cross-hatched pattern as will be described in detail later. Also included are second and third sections of fabric 44 and 48 also composed of fibers interwoven together in a cross-hatched fashion. The second and third sections of fabric 44 and 48 are also interwoven with the first section 40 along respective intersections 52 and 56 of the sections. The locus of points at which section 44 intersects section 40 and the locus of points at which section 48 intersects section 40 are spaced apart and generally parallel in the plane of section 40. As will be explained further later on, at least one fiber or fiber bundle of the section of fabric 40 is common with the section of fabric 44, and at least one other, fiber or fiber bundle of section 40 is common with section 48.

As seen in FIG. 2, portions of both sections 44 and 48 extend upwardly from section 40 and portions also extend downwardly therefrom. Likewise, a portion of section 40 extends outwardly in one direction from section 44, and another portion of section 40 extends outwardly in the opposite direction from section 48, with an intermediate portion of section 40 extending between sections 44 and 48. The sections 44 and 48 are shown as intersecting section 40 at right angles, but other angles of intersection could also be used as needed. Additionally, the fabric sections are bendable and thus may be made to conform to variety of shapes to which they might be bonded.

The spar 34 and skin cover 38 are connected together by placing section 44 flat against the underside of the skin covering 38 and bonding it thereto. The two upper portions of sections 44 and 48 extend into the skin covering 38 and are bonded to the interior of the skin section covering. The edge of the spar 34 is placed between the two lowermost portions of sections 44 and 48 and is bonded therebetween. A spar section 60 is also positioned between the two upper portions of the sections 44 and 48 as shown in FIG. 2. With this configuration, structural strength and efficient load transfer is achieved in all three directions of movement which the spar 34 may have relative to the skin covering 38.

FIG. 3 is a cross-sectional view of another embodiment of the woven fabric connector of the present invention. This embodiment also is shown coupling together a spar 64 to a skin covering 68. The connector of FIG. 3 includes a first section of woven fabric 72, and second and third sections of woven fabric 76 and 80 which are interwoven with the section 72 to extend downwardly therefrom as shown. The sections of fabric 76 and 78 intersect the section of fabric 72 along generally parallel loci of points at which intersections a fiber or bundle of fibers is common with the section 72 and respective sections 76 and 80.

The connector of FIG. 3 is utilized by placing section 72 flat against the bottom surface of the skin covering 68 and bonding it thereto. The spar 64 is positioned between sections 76 and 80 and is bonded to the sections, and to the underside of section 72.

FIG. 4 shows a cross-sectional view of still another embodiment of the woven fabric connector of the present invention. Specifically, two connectors 84 and 88 are shown interconnecting, at a right angle, the edges of two skin covers 92 and 96. Each of the connectors, such as connector 84, includes three sections 100, 104 and 108, all of which extend generally radially outwardly from an intersection 112 of the three sections. The three sections are composed of fibers interwoven together, with at least one fiber or bundle of fibers being common to the three sections.

The connector 88 is similar to the connector 84 except two of the sections are bent to overlie the outside corner of the joint of the two skin coverings 92 and 96, as shown. Two of the sections of connectors 84 and 88 extend into the joint between the skin coverings 92 and 96 generally in planes parallel to one another. The different sections of the two connectors 84 and 88 are bonded to the surfaces of the skin coverings with which they are placed in contact.

FIG. 5 shows a schematic representation of the weaving of the connector embodiment of FIG. 2. The connector includes lengthwise fibers or fiber bundles 120 which serve as the warp of the woven fabric. Interlaced through the lengthwise fibers 120 or warp are crosswise fibers or fiber bundles 124 which serve as the weft of the fabric. The crosswise fibers 124 of section 48 are interwoven about a lengthwise fiber or bundle of fibers 56 which is common and serves as an intersection with section 40. Similarly, the crosswise fibers 124 of the section 44 are interwoven with a lengthwise fiber or bundle of fibers 52 which is also common with the section 40. The common fiber or fiber bundle 52 is spaced from and generally parallel with the fiber or fiber bundle 56, as indicated in FIG. 5.

The crosswise fibers 124 are interwoven through the lengthwise fibers 120 to an edge of a section, such as section 48, and then extend about the edge and back through the lengthwise fibers 120 substantially without break. That is, the crosswise fibers 124 are looped about the edgemost lengthwise fibers without a break in the crosswise fibers. Although not indicated in the FIG. 5 embodiment, the crosswise fibers of one section may extend through the intersection with another section to form the crosswise fibers of that other section.

FIG. 6 shows schematically the interweaving of fibers of the woven fabric connector embodiment of FIG. 3. This connector also includes lengthwise fibers 130 interwoven with crosswise fibers 134, 138 and 142. The crosswise fibers 134 are shown interwoven with the lengthwise fibers 130 to form section 72 (as also shown in FIG. 3). Similarly, crosswise fibers 138 and 142 are interwoven with lengthwise fibers to form section 76 and 80 respectively. It is noted that the crosswise fibers in each of the sections do not extend into the other sections, other than extending to and about the fibers or fiber bundles 146 and 150 which are common to intersecting sections.

FIG. 7 is a schematic showing of the interweaving of the fibers for the woven fabric connector embodiment of FIG. 4. In this embodiment, crosswise fibers 160 are interwoven with lengthwise fibers 164 and extend from one section through the intersection 168 to form crosswise fibers of another section. In FIG. 7 the crosswise fibers extend from one section through the intersection 168 to a next section, and then from that section through the intersection 168 to the third section of fabric.

FIG. 8 shows a fragmented section of fabric which includes lengthwise fibers 180 interwoven with a continuous crosswise fiber 184. The crosswise fiber 184 is interwoven in one direction through the lengthwise fibers 180 and then about the edgemost lengthwise fiber and back in the other direction through the lengthwise fibers, etc. This continuous looping or weaving of the crosswise fiber forms advancing columns of weft in the fabric as generally indicated in FIG. 8.

The fabric connectors of the present invention are advantageously woven of fiber bundles of graphite, fiberglass, Kevlar, or similar high strength material.

Although different specific embodiments of the invention have been described, all such embodiments provide a three-dimensional woven fabric connector which provides a type of three-dimensional structural support. All of the embodiments include sections which are interwoven together and intersect at a common locus or loci of points. Each of these embodiments provides strength and efficient load transfer in three dimensions. The connectors, in addition to providing strong reliable connectors, are very lightweight.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A fabric joint for providing three-dimensional structural support for at least two intersecting structural members comprising
    a first section of fabric for attachment to one of the structural members and composed of fiber bundles interwoven together as warp and weft,
    a second section of fabric for attachment to the other of the structural members and also composed of fiber bundles interwoven together as warp and weft, and interwoven with said first section along an intersection of the two sections, with at least one fiber bundle of the warp, located at the intersection, being common to the two sections, wherein at least some of the fiber bundles of the weft of the first section extend through the intersection to form at least some of the fiber bundles of the weft of the second section, and
    a third section of fabric for attachment to one of the structural members at a location spaced from that at which either the first or second section is attached and composed of fiber bundles interwoven with the first section along a second intersection of the first and third sections which is generally parallel with and spaced apart from the first mentioned intersection, with at least one fiber bundle of the warp, located at the second intersection, being common to the first and third sections, and
    wherein the second and third sections each extend laterally in opposite directions from the first and second intersections respectively, and wherein the first section extends outwardly from the second section in one direction, and outwardly from the third section in the opposite direction.

2. A fabric joint as in claim 1 wherein the second and third sections intersect the first section generally at a right angle.

* * * * *